(12) United States Patent
Angele

(10) Patent No.: US 7,845,689 B1
(45) Date of Patent: Dec. 7, 2010

(54) SECURING APPARATUS

(76) Inventor: Dallas B. Angele, 6100B Francis Botello Rd., Goleta, CA (US) 93117

( * ) Notice: Subject to any disclaimer, the term of this patent is extended or adjusted under 35 U.S.C. 154(b) by 66 days.

(21) Appl. No.: 12/471,621

(22) Filed: May 26, 2009

(51) Int. Cl.
*D03J 3/00* (2006.01)
(52) U.S. Cl. .................................. 289/17; 289/18.1
(58) Field of Classification Search ............ 289/17, 289/18.1; D11/200, 202; D28/39–43
See application file for complete search history.

(56) References Cited

U.S. PATENT DOCUMENTS

| | | | | |
|---|---|---|---|---|
| 565,167 | A | * 8/1896 | Harmon | 24/18 |
| 1,522,571 | A | * 1/1925 | Becker | 289/17 |
| 1,863,878 | A | 6/1932 | Riley | |
| 2,074,817 | A | * 3/1937 | Von Bargen | 289/17 |
| 2,317,914 | A | * 4/1943 | McIntyre | 28/147 |
| 2,849,821 | A | 9/1958 | Doig | |
| 3,287,042 | A | * 11/1966 | Baer | 289/17 |
| 4,329,382 | A | 5/1982 | Truskolaski et al. | |
| D270,683 | S | * 9/1983 | McCarn | D3/23 |
| 4,476,168 | A | 10/1984 | Aoyama | |
| D276,942 | S | * 12/1984 | Crews | D28/66 |
| 4,515,837 | A | 5/1985 | Cheng | |
| 4,815,772 | A | * 3/1989 | Lizarraga | 289/1.5 |
| 5,094,370 | A | * 3/1992 | Specht | 223/46 |
| 5,098,137 | A | * 3/1992 | Wardall | 289/17 |
| 5,645,902 | A | 7/1997 | Cheng | |
| 5,679,415 | A | 10/1997 | Weder | |
| 5,679,416 | A | 10/1997 | Cheng | |
| 5,693,381 | A | 12/1997 | Cheng | |
| D401,486 | S | * 11/1998 | Becker | D8/19 |
| 7,014,080 | B2 | 3/2006 | Cheng | |

* cited by examiner

*Primary Examiner*—Shaun R Hurley
(74) *Attorney, Agent, or Firm*—Richard S Erbe

(57) ABSTRACT

The invention is securing apparatus to quickly and efficiently tying a knot or bow to securely wrap a package or parcel. The securing apparatus is configured as a planar element having an opening through it. A number of securing slits extend from the opening. When a person wants to tie a knot or bow in a ribbon, string or twine, he or she places the ends of the ribbon through the opening and secures each end in a slit. Then a person can tie the knot or bow without assistance from another person.

6 Claims, 1 Drawing Sheet

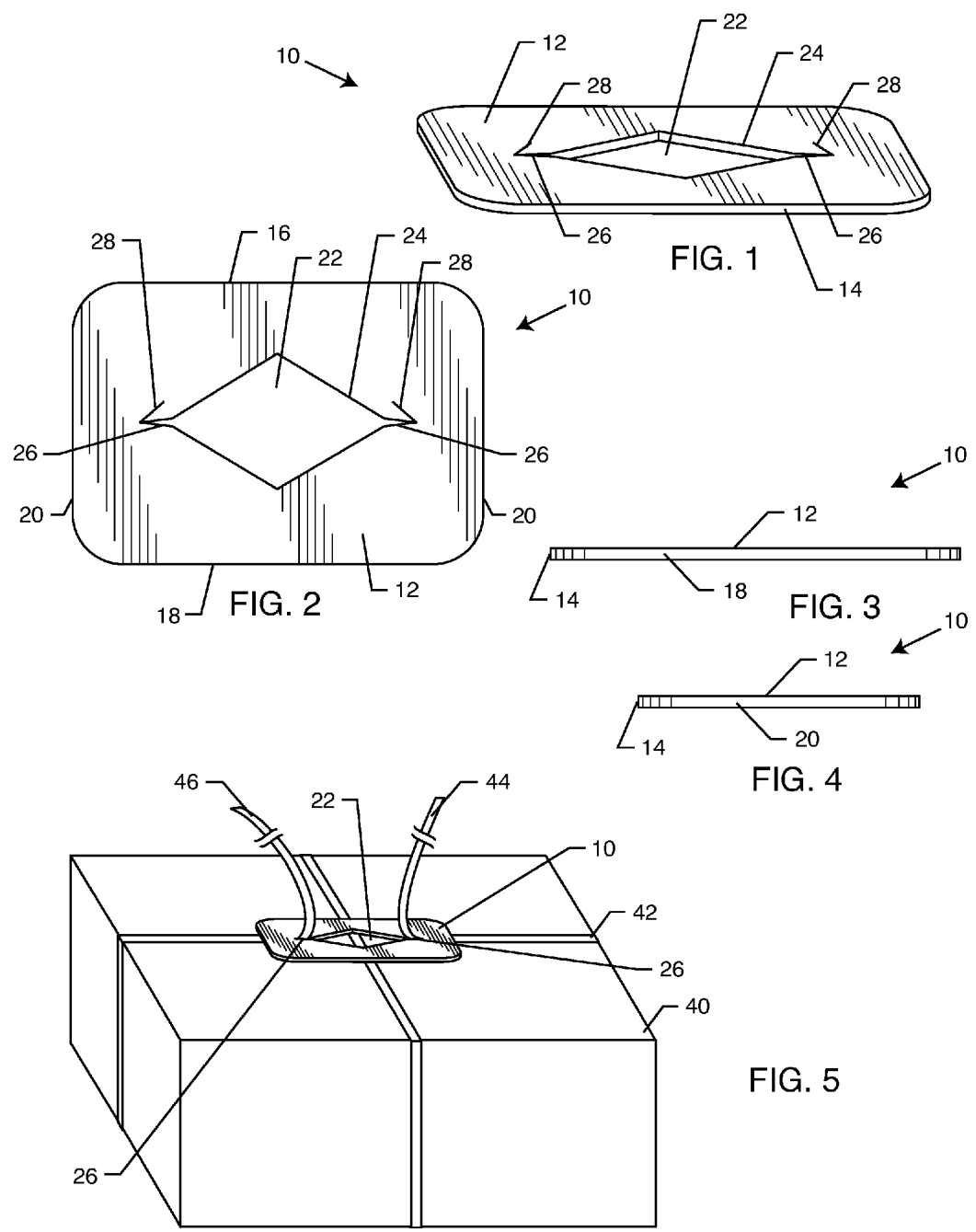

SECURING APPARATUS

RELATED APPLICATIONS

Not applicable.

BACKGROUND OF THE INVENTION

1. Field of the Invention

The present invention relates to the field of packaging, and, more particularly, the invention relates to a device for securing and holding binding means, such as ribbons, string, and twine, to assist an individual in securely wrapping packages and parcels.

2. General Background and State of the Art

Almost every individual at some time needs to securely wrap a gift package or a parcel. A gift package generally includes wrapping paper that may be themed for a particular occasion, such as Christmas, a birthday, or an anniversary. Most packages or parcels are secured by a binding means, such as a ribbon, string, or twine to ensure that the package or parcel will stay securely wrapped.

When a binding means is used to secure a package or parcel, it is first conveying around the package or parcel around the length and width. After doing so, the person doing the wrapping has two opposed ends of the binding means in their hands and now must tie the ends in a knot or bow. During the procedure normally used for tying the knot or bow, it is necessary, in order that the knot or bow complete the secure wrapping of the package or parcel, to hold the partially-tied knot or bow tightly to complete the tying procedure. If a person is alone, they must use a finger or other body part to hold the partially-tied knot or bow and complete the procedure. Frequently, the use of a finger or body part can lead to less than satisfying results, as the package or bow may not be tightly and securely tied and the individual must start over. Such a use of a finger, for example, can lead to pinching the finger.

If another person is with the individual who is tying the knot or ribbon, that person can lend a finger to secure the partially-tied knot, but that person also may experience having a finger pinched.

There thus exists a need for an apparatus to assist a person in securely wrapping a package or parcel.

There also exists a need for an apparatus to assist a person in securely wrapping a package or parcel that is easy to use.

There also exists a need for an apparatus to assist a person in securely wrapping a package or parcel that can be used with a variety of binding means, such as ribbon, string or twine.

There also exists a need for an apparatus to assist a person in securely wrapping a package or parcel that can be used as a decorative element in the packaging or parcel.

The securing apparatus of the present invention provides all of the above advantages, as well as other advantages as will be described, and overcomes the disadvantages of known methods and devices for wrapping packages and parcels.

SUMMARY OF THE INVENTION

It is therefore an object of the present invention to provide an apparatus to assist a person in securely wrapping a package or parcel that is easy to use.

It is a further object of the present invention to provide an apparatus to assist a person in securely wrapping a package or parcel which may be efficiently and economically fabricated.

Yet another object of the present invention is to provide an apparatus to assist a person in securely wrapping a package or parcel that may be provided in a variety of shapes and sizes.

Another object of the present invention is to provide an apparatus to assist a person in securely wrapping a package or parcel that can be used with a variety of binding means.

These and other objectives are achieved by the present invention, which, in a broad aspect, provides an apparatus for securing binding means for securely wrapping packages or parcels that incorporates a planar element having an opening through which the opposed ends of a binding means may be placed during the wrapping procedure.

Two or more securing slits extend through the planar element along the periphery defined by the opening. The securing slits are designed to tightly hold the ends of the binding means so that a person can let go of the binding means without the binding means coming loose. Auxiliary slits adjoining the securing slits may also be incorporated into the present invention to provide additional securing or to provide structural characteristics to allow a variety of types, shapes and sizes of binding elements to secure the package or parcel.

An example of how to use the apparatus according to the present invention is for a person to first place the binding means around the package length and width. The person then places the opposed ends of the binding means through the opening in the securing apparatus according to the present invention, so that a first end portion and a second end portion of the binding means are extending through the opening. The first end portion is placed and secured in one of the securing slits disposed along the periphery of the opening. The second end portion is placed and secured in a separate securing slit disposed along the periphery of the opening. The person then may tie the end portions into a secure knot or bow without having to use a finger or other body part to hold the ends of the binding means.

Further objects and advantages of this invention will become more apparent from the following description of the preferred embodiment of the invention, which, taken in conjunction with the accompanying drawings, will illustrate, by way of example, the principles of the invention.

BRIEF DESCRIPTION OF THE DRAWINGS

The foregoing and other aspects and advantages of the present invention will be better understood from the following detailed description of the preferred embodiment of the invention with reference to the drawings in which:

FIG. 1 illustrates a perspective view of an exemplary embodiment of a securing apparatus according to the present invention;

FIG. 2 illustrates a plan view of an exemplary embodiment of a securing apparatus according to the present invention;

FIG. 3 illustrates a side view of an exemplary embodiment of a securing apparatus according to the present invention;

FIG. 4 illustrates an end view of an exemplary embodiment of a securing apparatus according to the present invention; and FIG. 5 illustrates a method of using of an exemplary embodiment of a securing apparatus according to the present invention in conjunction with a package or parcel.

DETAILED DESCRIPTION OF THE PREFERRED EMBODIMENT OF THE INVENTION

In the following description of the invention, reference is made to the accompanying drawings, which form a part thereof, and in which are shown, by way of illustration, an exemplary embodiment illustrating the principles of the securing apparatus of the present invention and how it may be practiced and assembled. It is to be understood that other embodiments may be utilized to practice the present invention and structural and functional changes may be made thereto without departing from the scope of the present invention.

A preferred embodiment of a securing apparatus according to the present invention is generally indicated by the numeral 10 and is best illustrated in FIGS. 1-4. FIG. 5 illustrates how apparatus 10 may be used in conjunction with a package or parcel.

Securing apparatus 10 includes a planar element 12 that defines a perimeter 14. In the exemplary embodiment illustrated, planar element 12 is generally rectangular in shape, but it will be apparent to those skilled in the art that planar element 12 could be circular, elliptical, ovular, triangular or polygonal in configuration without departing from the scope of the invention. Planar element 12, as illustrated, includes first edge 16, opposed second edge 18, and a pair of opposed sides 20 extending between first edge 16 and second edge 18. Securing apparatus 10 may be constructed of a variety of materials, such as plastic, wood, aluminum foil, paper, cardboard, sheet metal, and the like.

Opening 22 in planar element 12 defines periphery 24 and allows for a binding means to be extended through securing apparatus 10. In the embodiment illustrated, opening 22 is shown having a diamond shape with generally straight sides defining periphery 24. It will be apparent to those skilled in the art that opening 22 may be made in a variety of shapes, such as polygonal, circular, or elliptical, for example, without departing from the scope of the invention.

Securing slits 26, which extend from periphery 24, are preferably disposed opposite each other on securing apparatus 10. Securing slits 26 allow the user to secure a binding means, such as ribbon, string, twine or the like during the process of securely wrapping a package or parcel, as will be discussed. While two securing slits 26 are illustrated, it should be noted that securing apparatus 10 may include more than two securing slits without departing from the scope of the invention.

Auxiliary slits 28, each of which extends from a securing slit 26, provide another way to secure a binding means and provide additional structural features to enable efficient use of securing apparatus 10 and allow for the use of a variety of shapes, types, and sizes of binding means.

FIG. 5 illustrates how securing apparatus 10 is used during the process of securely wrapping a parcel or package 40. With the package sides closed, a binding means 42 is disposed along the outside of package 40, generally in a fashion so that the binding means extends along a length and width of package 40 and overlaps at least once. Binding means 42 may be ribbon, string, twine or the like.

After binding means 42 has been disposed along package 40, a first end portion 44 and a second end portion 46 of binding means 42 remain to further secure package 40. End portions 44 and 46 are extended through opening 22 in securing apparatus 10. Each end portion is then secured in a separate securing slit 26, or in a separate auxiliary slit 28. With first end portion 44 and second end portion 46 now secured, the user of securing apparatus 10 is now free to tie a bow or a knot of a desired size and shape to finish the process of wrapping and securing package 40. It is important to note that securing apparatus 10 is specifically designed to keep the end portions of binding means 42 disposed separate and apart to facilitate the wrapping and packaging process.

The foregoing description of an exemplary embodiment of the present invention has been presented for purposes of enablement, illustration, and description. It is not intended to be exhaustive of or to limit the present invention to the precise forms discussed. There may be, however, other configurations of securing devices not specifically described herein, but with which the present invention is applicable. The present invention should therefore not be seen as limited to the particular embodiment described herein; rather, it should be understood that the present invention has wide applicability with respect to securing devices and their manufacture. Such other configurations can be achieved by those skilled in the art in view of the description herein. Accordingly, the scope of the invention is defined by the following claims.

What is claimed is:

1. A securing apparatus comprising:
    a planar element;
    a perimeter defined by said planar element;
    an opening extending through said planar element, said opening defining a periphery; and
    at least two securing slits extending from said periphery, wherein said perimeter is generally rectangular in shape, and wherein said at least two securing slits are disposed directly opposite from one another along said periphery.

2. The securing apparatus according to claim 1, further comprising one or more auxiliary slits adjoining said securing slits.

3. The apparatus according to claim 1, wherein said periphery has straight sides.

4. The apparatus according to claim 3, wherein said periphery is diamond shaped.

5. A method of securing a closed package comprising the steps of:
    providing a binding means having a first end portion and an opposed second end portion;
    placing said binding means on the package;
    positioning said end portions adjacent each other;
    providing a securing apparatus having an opening and at least two slits extending from said opening;
    placing said end portions through said slits; and
    tying the two end portions together to form a knot.

6. The method according to claim 5, wherein said binding element is one of
    ribbon;
    string; and
    twine.

* * * * *